United States Patent
Lee et al.

(10) Patent No.: US 11,299,902 B2
(45) Date of Patent: Apr. 12, 2022

(54) DAMPING SYSTEM UTILIZING SPACE BETWEEN STAIR CHAMBER AND INNER BUILDING

(71) Applicant: INDUSTRY-ACADEMIC COOPERATION FOUNDATION, DANKOOK UNIVERSITY, Yongin-si (KR)

(72) Inventors: Sang Hyun Lee, Yongin-si (KR); Lan Chung, Seoul (KR); Tae Won Park, Anyang-si (KR); Moo Won Hur, Seoul (KR); Ji Eun Roh, Seoul (KR)

(73) Assignee: INDUSTRY-ACADEMIC COOPERATION FOUNDATION, DANKOOK UNIVERSITY, Yongin-si (KR)

( * ) Notice: Subject to any disclaimer, the term of this patent is extended or adjusted under 35 U.S.C. 154(b) by 348 days.

(21) Appl. No.: 16/326,891

(22) PCT Filed: Oct. 25, 2017

(86) PCT No.: PCT/KR2017/011825
§ 371 (c)(1),
(2) Date: Feb. 20, 2019

(87) PCT Pub. No.: WO2018/117389
PCT Pub. Date: Jun. 28, 2018

(65) Prior Publication Data
US 2021/0277681 A1 Sep. 9, 2021

(30) Foreign Application Priority Data
Dec. 20, 2016 (KR) .................. 10-2016-0174820

(51) Int. Cl.
*E04H 9/02* (2006.01)
*E04B 1/98* (2006.01)

(52) U.S. Cl.
CPC .............. *E04H 9/0237* (2020.05); *E04B 1/98* (2013.01); *E04H 9/027* (2013.01); *E04H 9/0215* (2020.05)

(58) Field of Classification Search
CPC ......... E04H 9/0215; E04H 9/04; E04H 9/021; E04H 9/0237; E04B 1/98
See application file for complete search history.

(56) References Cited

U.S. PATENT DOCUMENTS

| 7,647,734 B2 * | 1/2010 | Sarkisian | .............. E04H 9/0237 52/167.3 |
| 8,943,763 B2 * | 2/2015 | Lim | ....................... E04H 9/0237 52/167.1 |

(Continued)

FOREIGN PATENT DOCUMENTS

| CA | 2820820 C | * 12/2013 | ............... E04B 1/98 |
| CN | 106013452 A | * 10/2016 | ........... E04B 1/3404 |

(Continued)

OTHER PUBLICATIONS

Korea Land & Housing Corporation, Machine_translate_KR20140032031.pdf (Year: 2014).*

(Continued)

*Primary Examiner* — Babajide A Demuren
(74) *Attorney, Agent, or Firm* — Seed IP Law Group LLP

(57) ABSTRACT

The present invention relates to a damping system that utilizes a space between an inner building and a stair chamber installed outside the inner building to control vibration of an earthquake applied to a building or a building structure, and more particularly, to a damping system utilizing a space between a stair chamber and an inner building, which is installed in a building structure including the inner building and the stair chamber to damp a transverse force due to seismic waves.

5 Claims, 4 Drawing Sheets

(56) References Cited

U.S. PATENT DOCUMENTS

| | | | | |
|---|---|---|---|---|
| 9,062,456 | B2* | 6/2015 | Kollegger | E04H 9/02 |
| 10,662,645 | B2* | 5/2020 | Kochiyama | E04H 9/02 |
| 10,794,078 | B2* | 10/2020 | Lee | E04H 9/021 |
| 10,968,636 | B2* | 4/2021 | Charles | E04F 11/062 |
| 2008/0022623 | A1* | 1/2008 | Brienen | E04C 5/06 |
| | | | | 52/583.1 |
| 2012/0204509 | A1* | 8/2012 | Lim | E04H 9/021 |
| | | | | 52/393 |
| 2013/0283709 | A1* | 10/2013 | Christopoulos | E04H 9/02 |
| | | | | 52/167.1 |

FOREIGN PATENT DOCUMENTS

| | | | | |
|---|---|---|---|---|
| CN | 107476461 | A | * | 12/2017 |
| JP | 2000-008647 | A | | 1/2000 |
| JP | 2000282697 | A | * | 10/2000 ......... E04G 23/0266 |
| JP | 3817096 | B2 | | 8/2006 |
| JP | 2008-063821 | A | | 3/2008 |
| JP | 2014201913 | A | * | 10/2014 |
| KR | 10-0799980 | B1 | | 1/2008 |
| KR | 10-1337390 | B1 | | 12/2013 |
| KR | 10-1449930 | B1 | | 10/2014 |
| KR | 10-1555232 | B1 | | 9/2015 |
| KR | 10-1593885 | B1 | | 2/2016 |
| WO | WO-2011029749 | A1 | * | 3/2011 ............. E04H 9/021 |
| WO | WO-2019020991 | A | * | 1/2019 ............. E04H 9/025 |
| WO | WO-2020073111 | A1 | * | 4/2020 ............... E04B 5/14 |

OTHER PUBLICATIONS

International Search Report, dated Feb. 14, 2018, for PCT/KR2017/011825, 2 pages.

* cited by examiner

[FIG. 1]
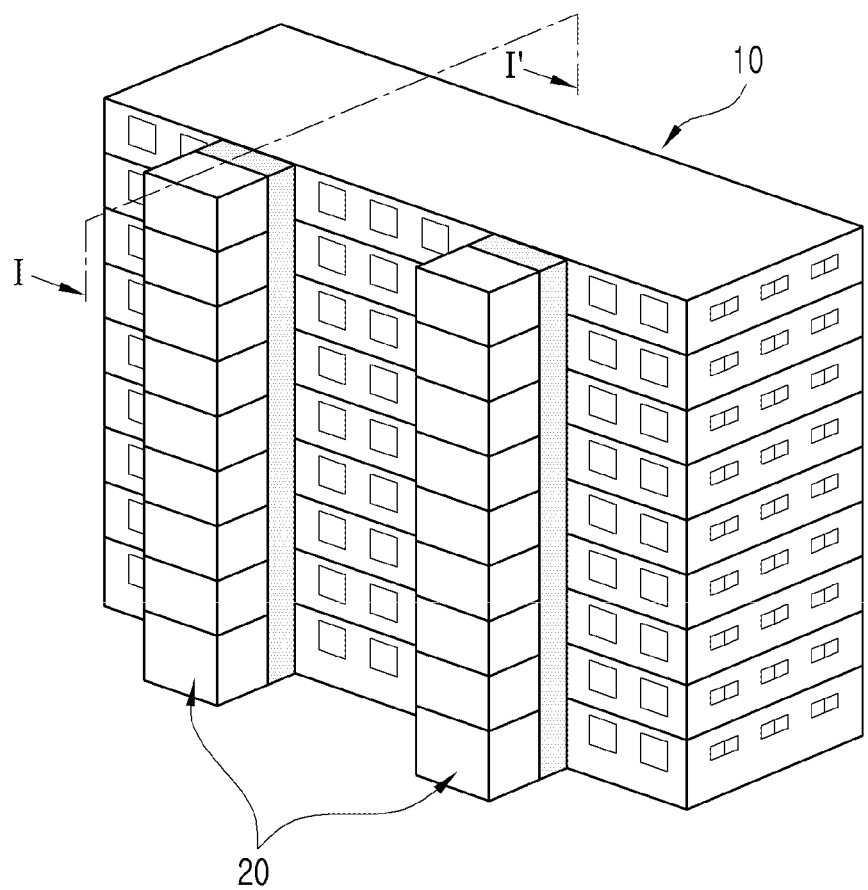

[FIG. 2]
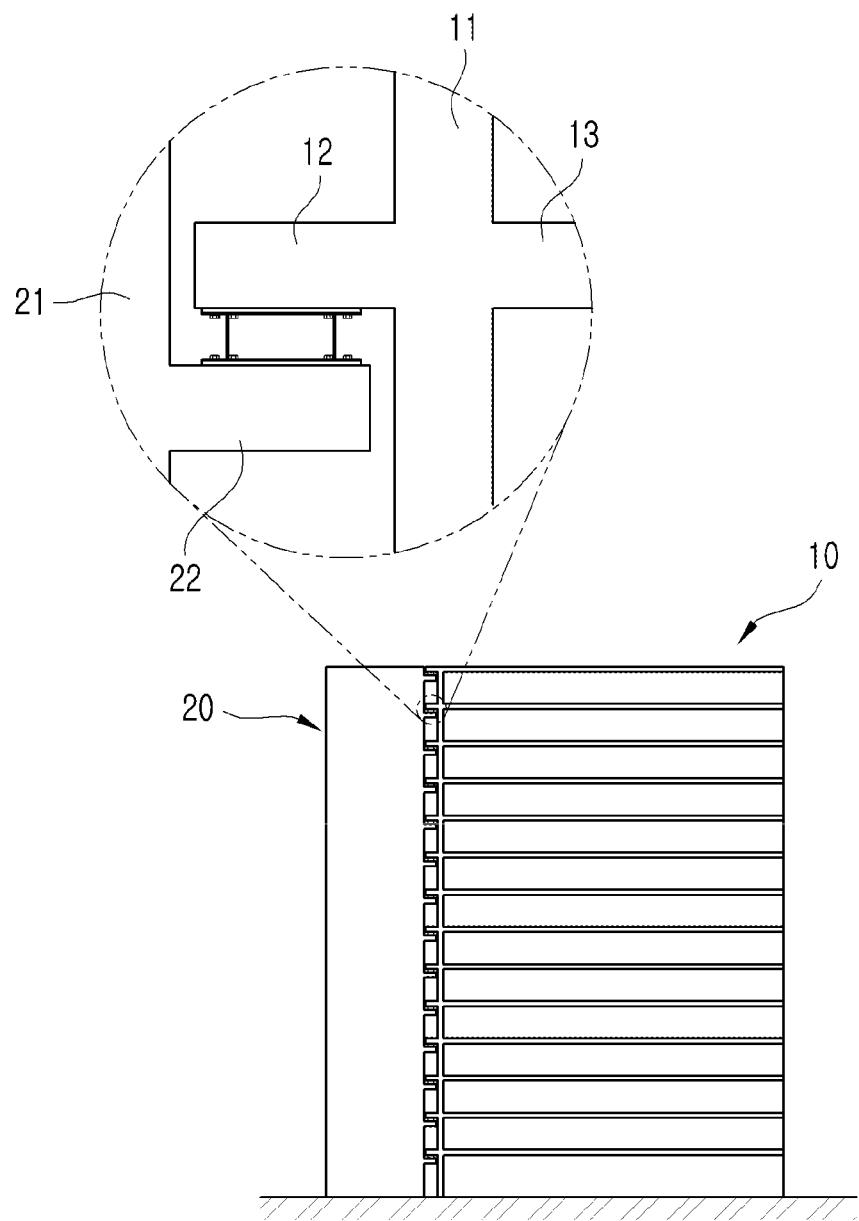

[FIG. 3]
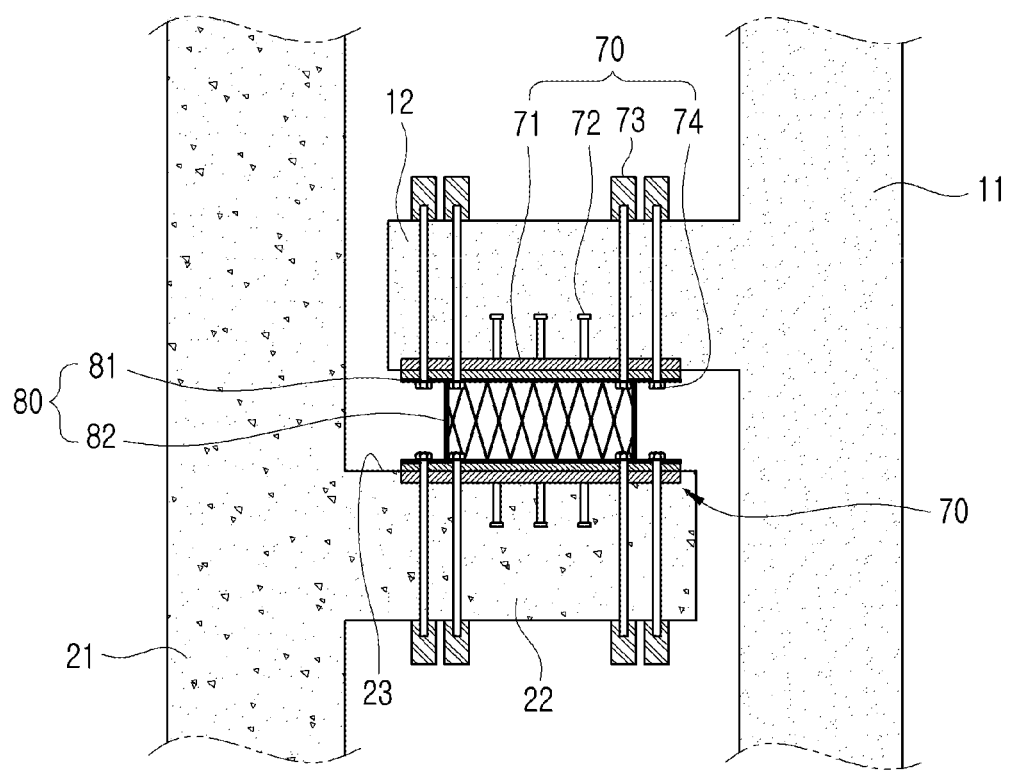

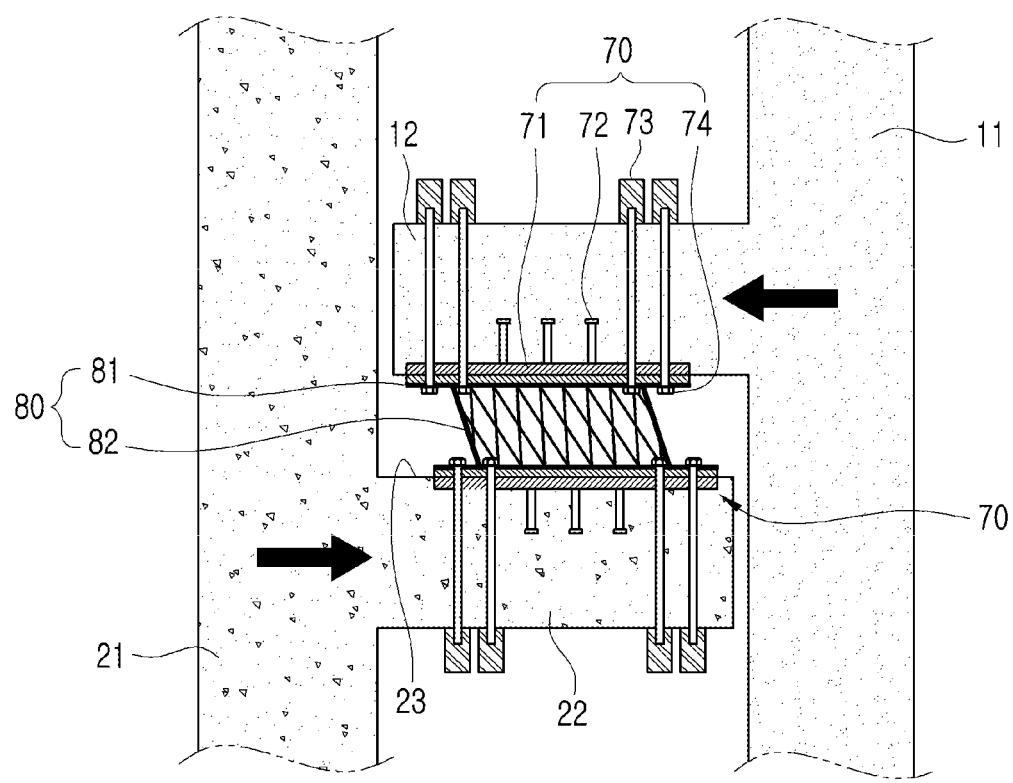
[FIG. 4]

DAMPING SYSTEM UTILIZING SPACE BETWEEN STAIR CHAMBER AND INNER BUILDING

TECHNICAL FIELD

The present invention relates to a damping system that utilizes a space between an inner building and a stair chamber installed outside the inner building to control vibration of an earth quake applied to a building or a building structure, and more particularly, to a damping system utilizing a space between a stair chamber and an inner building, which is installed in a building structure including the inner building and the stair chamber to damp a transverse force due to seismic waves.

BACKGROUND ART

A method for minimizing a damage of an earthquake is a method of improving a vibration-resistant performance of a structure by installing a damping device that mechanically controls vibration of the structure due to an earthquake inside or outside the structure as a damping structure and allowing the damping device to absorb most of vibrational energy. The effects of the damping structure have been positively proven in foreign countries, such as Japan, the U.S. and New Zealand, which have many experiences on earthquakes. Thus, the damping structures have been widely utilized in the fields. Despite there are some disagreements on practicability of the damping structure due to increased difficulty of post-earthquake restorations in the areas prone to have a strong earthquake or multiple earthquakes, the damping structure is particularly preferred to a vibration isolating structure in a middle/weak earthquake areas due to an economical advantage related to initial installation costs.

The structural forms of existing multi-family housing mainly have wall type structures, but there are continuous efforts to change the structure systems to Rahmen structure or mushroom structures that are helpful for overcoming variety of issues including increased demand for housing, a demand for longer life, and increasing impact noise between floors.

However, it is expected that the employment of the structure considerably increases construction costs as compared with the existing wall type structures, and interests on the damping structure have increased to construct more effective earthquake-resistant structures due to concerns on the limitation of a conventional earthquake-resistant design using a force resisting method.

Recently, in Korea, as the need for the damping device came into light, buildings employing the damping devices were numerously designed and constructed.

A passive damping system employing a steel hysteresis damper is widely used since such damper provides a high energy dissipation at low cost of installation and maintenance.

The most well-known method of operation of a damping system is to install vibration removing devices, such as dampers, and dissipating energy with a hysteretic behavior arising from change in inter-floor space. A damper disclosed in patent document 1 is applied as a vibration removing device, and the damper is installed between structures including a beam and a column and a brace installed to be spaced apart from the structure and dissipates energy of an external force applied to the structure as it is sheared while moving in a state in which the brace crosses the structure when the structure is displaced due to an earthquake.

However, according to the conventional vibration removing device, because a relative structure such as a brake has to be installed in the interior of the structure, an installation space is restricted and spatial utility for an inside of a building is lowered as well, and an installation structure of various pipes and appended configurations installed in the building have to be changed when the vibration removing device is applied to the building.

Accordingly, the inventor of the application has suggested an outside vibration removing system disclosed in patent document 2.

In the vibration removing system of patent document 2, a separate relative structure including a separation frame and a seat frame is installed outside the building structure, and a damper is installed between the relative structure and the building structure. That is, a large utility space in the building may be secured as the damper is installed outside the building.

However, the vibration removing system of patent document 2 may secure a utility space inside the building but a relative structure has to be additionally installed outside the building, and the installed relative structure hampers the beauty of the building while hiding the field of view.

(Patent document 1) patent document 1: KR 1,555,232 B1
(Patent document 2) patent document 2: KR 1,449,930 B1

DISCLOSURE

Technical Problem

The present invention has been made in an effort to solve the above-mentioned problems, and provides a damping system that improves a vibration-resistant performance of an existing structure and solves the above-mentioned problems.

Technical Solution

In accordance with an aspect of the present invention, there is provided a damping system, which is installed in a building having frames and a shear wall as a structure and further having a stair chamber, wherein the frames include columns and beams, and wherein the stair chamber is protruded on a surface of the building, comprising: an extension frame extending from a surface of the frame to a surface of the stair chamber; a seat frame extending from a surface of the stair chamber to be spaced vertically from the extension frame and providing a seating surface that faces a surface of the extension frame; a damping device, which is fixed between the seating surface of the seat frame and the extension frame and which is configured to be moved horizontally; and a coupling unit integrally fixing the damping device to the seating surface of the seat frame and the extension frame, wherein the damping device moves horizontally in a state in which the damping device is interposed between the extension frame and the seat frame to absorb a transverse force transferred to the frame while being sheared by a transverse displacement of the extension frame as the damping device supports the extension frame while the seating surface of the seat frame is moved relative to the extension frame.

It is preferable that the damping device includes an isotropic structure.

It is preferable that the isotropic structure facilitate relative isotropic motion against the direction of movement of the extension frame.

It is preferable that the coupling unit includes: fixed plates fixed to the seating surface of the seat frame and the extension frame, respectively; a coupling member passing through the fixed plate fixed to the seating surface and the fixed plate fixed to the extension plate; and nuts coupled to sides of the coupling members.

It is preferable that the damping system further comprising: a housing located between the extension frame and the seat frame and configured to seal an outside of the damping device.

Advantageous Effects

As described above, the damping system utilizing a space between a stair chamber and an inner building according to the present invention may prevent plastic deformation of the frame of the inner building by supporting a transverse load with the damping device between the stair chamber and the inner building when an earthquake is generated, may reduce transverse vibration, and may achieve economic feasibility by reducing a story shearing force of the inner building and reducing the number of the frames of the inner building.

Further, the number of damping device may be reduced because the multi-axial isotropic damping device may control all directions at one site.

In particular, because the damping device is installed between the stair chamber and the inner building, it may be installed without hampering indoor and outdoor use spaces of the building while not being exposed to the outside, and the field of view and the external appearance of the building are not spoiled as the limitation of the installation space may be solved.

DESCRIPTION OF THE INVENTION

FIG. 1 is a perspective view of a building structure including an inner building and an outside stair chamber, and schematically illustrates a site at which a damping system utilizing a space between a stair chamber and an inner building according to an embodiment of the present invention;

FIG. 2 is a sectional view taken along line of FIG. 1, and is a schematic view of a site at which a damping system utilizing a space between a stair chamber and an inner building according to an embodiment of the present invention;

FIG. 3 is a detailed view of an enlarged part of FIG. 2; and

FIG. 4 is a detailed view of the enlarged part of FIG. 2, and illustrates a horizontal movement of a damping device.

BEST MODE

The objectives, features, and other advantages of the present invention will be more apparent by describing exemplary embodiments of the present invention in detail with reference to the accompanying drawings. It should be noted that the drawings does not represent precise scale and may be exaggerated in thickness of lines or size of components for descriptive convenience and clarity. In addition, terms used herein are defined by taking functions of the present invention into account and can be changed according to practice or intention of user or operator. Therefore, definition of the terms should be made according to the overall disclosure set forth herein.

Further, the exemplary embodiments are provided to describe of the present invention, and are not intended to limit the technical scope of the present invention.

The elements constituting the damping system utilizing a space between a stair chamber and an inner building according to the present invention may be integrally used or separately used as occasional demands. Further, some elements may be omitted according to the usage of the apparatus.

Hereinafter, a damping system utilizing a space between a stair chamber and an inner building according to the embodiment of the present invention will be described in detail with reference to the accompanying drawings, and a detailed description related to well-known general functions and configurations will be omitted.

As illustrated in FIGS. 1 and 2, the damping system employs a damping device installed in a building structure having a stair chamber 20 and utilizes displacement of space between an inner building 10 and a stair chamber 20 which is constructed outside of the inner building 10, wherein the inner building 10 comprises frames comprising columns 11 and beams 13, and wherein the stair chamber extends from a surface of the inner building and comprises shear walls 21 (see a shadowed part of FIG. 1).

As illustrated in FIG. 3, the damping system utilizing a space between a stair chamber and an inner building according to an embodiment of the present invention includes an extension frame 12, a seat frame 22, a damping device 80, and a coupling unit.

The extension frame 12 extends outwards from a frame of the inner building of the building structure, wherein the frame comprises the column 11 and the beam 13. Accordingly, as illustrated, the extension frame 12 protrudes to the outside of the frame while forming an integral body with the frame. Accordingly, the extension frame 12 is displaced together with the frame when the inner building 10 vibrates.

The extension frame 12 may extend from one side of the beam 13 of the frame in a form of a beam but may extend from a surface of the column 11 separately from the beam 13.

Further, the extension frame 12 may protrude from an outside of the frame (the beam and the column) of the inner building 10 in the form of a plank.

It is preferable that the extension frame 12 constitutes same material as the material used in the frame. Thus, if the frame is a steel frame, such as an H-beam, it is prefer to have the extension frame 12 to be made with identical type of steel. If the frame is made of a reinforced concrete beam, it is prefer to have the extension frame 12 made with a reinforced concrete beam. The present invention is not limited thereto and may be a combination thereof.

In addition to the above-mentioned kind, the extension frame 12 may be made with various kinds of materials. That is, the extension frame 12 may be made with the above-mentioned steel frame, reinforced concrete, precast concrete, steel reinforced concrete, or the like.

The seat frame 22 extends from a surface of the shear wall 21 of the stair chamber 20 to the extension frame 12.

The shear wall 21 is designed to resist a transverse force and its wall may resist a horizontal load. The shear wall is usually made with a reinforced concrete structure and has a strong resistance to horizontal force.

Accordingly, the damping device 80, which will be described below, may be installed between the inner building 10 having the frame and the stair chamber 20 having the shear wall 21 to effectively dissipate a transverse force applied to the frame of the inner building 10.

The seat frame 22 is spaced vertically apart from the extension frame 12 by a specific distance, and has a seating surface 23 that faces a surface of the extension frame 12.

The seat frame 22 may include at least any one of a beam or a block installed on a surface of the shear wall 21 of the stair chamber 20, wherein the seat frame 22 is installed perpendicular to the shear wall 21.

The seating surface 23 of the seat frame faces upward where the extension frame 12 is located such that the damping device 80 may be easily installed.

When seat frame 22 made with a block, in order to disperse the load applied to the seating surface 23, the seat frame 22 may be constructed in such way that the slope of the seat frame 22 decreases as the seat frame 22 extends downward.

Further, when the seat frame 22 constitutes a beam or a tubular body in the form of a pipe, a general brace (not illustrated) that supports a lower side of the seating surface 23 is installed such that the seat frame 22 has shelf-like design Accordingly, a load on the seating surface 23 of the seat frame 22 may be dispersed and transferred to the shear wall 21 of the stair chamber 20.

The damping device 80 is fixed between the seating surface 23 of the seat frame 22 and a lower surface of the extension frame 12, and is configured to be moved horizontally in such configuration.

As illustrated in FIG. 4, the damping device 80 reduces vibration by flexibly supporting the extension frame 12, therein the damping device 80 is seated on the seat frame 22 and absorbing a transverse force transferred to the frame of the inner building 10, wherein the absorption of the transverse force is achieved through displacement of the extension frame 12 and the frame.

A general absorber including an elastic material, a viscous material, a frictional material, a steel material, or oil, on which a transverse force is applied, may be used in the damping device 80, but as illustrated in FIGS. 3 and 4, according to the present embodiment, the damping device 80 may include an isotropic structure wherein a relative isotropic motion against the direction of movement of the extension frame 12 can be facilitated.

Further, it is preferable that the damping device 80 includes an isotropic structure having a Kagome truss for generating a smooth relative isotropic motion of the damping device as illustrated.

In this case, as illustrated in FIG. 3, the damping device 80 includes an absorber 82 including a Kagome truss and a case 81 that covers the absorber 82.

A viscous fluid, such as oil or grease, may be filled in the case 81, for smooth movement of the absorber 82.

The coupling unit fixes the damping device 80 to the seating surface 23 of the seat frame 22 and a lower surface of the extension frame 12, wherein the coupling fixture also enables the damping device 80 to be detachable.

The coupling unit may be a detachable fixing unit 70 including fixed plates 71, nuts 73, and a coupling member 74.

The fixed plate 71 are fixed to the seating surface 23 of the seat frame 22 and the extension frame 12, respectively.

As illustrated, when the extension frame 12 and the seat frame 22 are concrete structures, the fixed plate 71 are fixed so that portions of the fixed plate 71 are implanted in the extension frame 12 and the seat frame 22.

Stop pins 72 in the form of a bolt are implanted in the extension frame 12 and the seat frame 22 to be stopped so that the fixed plate 71 is firmly fixed to the extension frame 12.

As illustrated, at the top, the coupling member 74 is fixed to the nut 73 after passing through the case 81 on the upper side of the damping device 80, the fixed plate 71 on the upper side of the damping device 80, and the extension frame 12. The lower end of coupling member. At the bottom, the coupling member 74 is fixed through the case 81 on the lower side, the fixed plate 71 on the lower side, and the seat frame 22.

As described above, the nuts 73 is coupled to the coupling member 74 that protrudes after passing through the extension frame 12 and the seat frame 22.

Further, the nuts 73 may be configured such that the outer diameters of the nuts 73 are expanded when the coupling member 74 is coupled to provide a coupling force, for example, of an anchor bolt.

Accordingly, the damping device 80 is integrally fixed to the extension frame 12 and the seat frame 22 with the coupling member 74 and the nuts 73, and may provide a stronger coupling force as it is coupled after passing through the frames 12 and 22.

Further, although not illustrated, a housing (not illustrated) that is located between the frames 12 and 22 may be installed to seal the space between cases 81.

Accordingly, the components of the damping device 80 are not exposed to the exterior air so that the device may be prevented from deterioration and be easily maintained.

Hereinafter, an installation and an operation of the damping system utilizing an exterior stair chamber according to an embodiment of the present invention will be described as follows with reference to the accompanying drawings again.

The extension frame 12 extends outwards from a frame including the beam 13 and the column 11 when the inner building 10 is constructed.

The seat frame 22 is integrally constructed with the shear wall 21 of the stair chamber 20. The seat frame 22 may be constructed together with the shear wall 21 when the shear wall 21 is constructed, or may be installed on one side of the shear wall 21 after the shear wall 21 is constructed.

According to the coupling unit, the fixed plates 71 and the nuts 73 are fixed together to the extension frame 12 and the seat frame 22.

An upper side and a lower side of the damping device 80 are fixed to the extension frame 12 and the seat frame 22, respectively, as the coupling member 74 of the detachable fixing unit 70 is coupled to the nuts 73 after passing through the case 81.

As illustrated in FIG. 4, when the extension frame 12 is moved transversely due to vibration to the frame of the inner building 10 caused by an earthquake, etc., the damping device 80 flexibly supports the extension frame 12 through shear deformation of the absorber 82.

Then, the damping device 80 may flexibly response to the movement direction of the extension frame 12 as the absorber 82 made of a Kagome truss, and may absorb vibrational energy transferred to the extension frame 12 through the shear deformation of the absorber 82.

Accordingly, with the damping device 80, the frame of the inner building 10 is protected from vibration.

Here, as described above, if a lower side of the seating surface 23 has downward slope or a brake is attached to the lower side of the seating surface 61, the seat frame 22 may uniformly disperse a load applied to the seating surface 23 to the shear wall 21 of the stair chamber 20 during the damping operation of the damping device 80.

Accordingly, the damping device 80 may be firmly supported by the seat frame 22.

Further, because the damping device 80 is fixed to the extension frame 12 and the seat frame 22 by the coupling member 74 and the fixed plates 71 of the detachable fixing unit 70, it may be easily installed and replaced (disassembled) if necessary.

As described above, the damping system utilizing a space between a stair chamber and an inner building according to the present invention may prevent plastic deformation of the frame of the inner building by supporting a transverse load with the damping device between the stair chamber and the inner building when an earthquake is generated, may reduce transverse vibration, and may achieve economic feasibility by reducing a story shearing force of the inner building and reducing the number of the frames of the inner building.

Further, the number of damping device may be reduced because the multi-axial isotropic damping device may control all directions at one site.

In particular, because the damping device is installed between the stair chamber and the inner building, it may be installed without hampering indoor and outdoor use spaces of the building while not being exposed to the outside, and the field of view and the external appearance of the building are not spoiled as the limitation of the installation space may be solved.

Although the preferred embodiments of the present invention have been described, the present invention is not limited to the embodiments. That is, the present invention may be variously changed and corrected by those skilled in the art to which the present invention pertains without departing from the spirit and scope of the claims, and all the modifications and equivalents have to be regarded as pertaining to the scope of the present invention.

The invention claimed is:

1. A damping system, which is installed in a building having frames and a shear wall as a structure and further having a stair chamber, wherein the frames include columns and beams, and wherein the stair chamber is protruded on a surface of the building, comprising:
    an extension frame extending from a surface of the frame to a surface of the stair chamber and made of the same material as the frame;
    a seat frame extending from a surface of the stair chamber to be spaced vertically from the extension frame, the seat frame made of a shear wall which is made of the same material as the stair chamber, and providing a seating surface that faces a surface of the extension frame;
    a damping device, which is fixed between the seating surface of the seat frame and the extension frame and which is configured to be moved horizontally; and
    a coupling unit integrally fixing the damping device to the seating surface of the seat frame and the extension frame,
    wherein the damping device moves horizontally in a state in which the damping device is interposed between the extension frame and the seat frame to absorb a transverse force transferred to the frame while being sheared by a vibration and a transverse displacement of the extension frame as the damping device supports the extension frame while the seating surface of the seat frame is moved relative to the extension frame.

2. The damping system of claim 1, wherein the damping device includes an isotropic structure.

3. The damping system of claim 2, wherein the isotropic structure facilitate relative isotropic motion against the direction of movement of the extension frame.

4. The damping system of claim 1, wherein the coupling unit includes:
    fixed plates fixed to the seating surface of the seat frame and the extension frame, respectively;
    a coupling member passing through the fixed plate fixed to the seating surface and the fixed plate fixed to the extension plate; and
    nuts coupled to sides of the coupling members.

5. The damping system of claim 1, further comprising:
    a housing located between the extension frame and the seat frame and configured to seal an outside of the damping device.

* * * * *